(12) United States Patent
Ben-Yaakov (10) Patent No.: US 6,445,600 B2
(45) Date of Patent: Sep. 3, 2002

(54) MODULAR STRUCTURE OF AN APPARATUS FOR REGULATING THE HARMONICS OF CURRENT DRAWN FROM POWER LINES BY AN ELECTRONIC LOAD

(75) Inventor: Shmuel Ben-Yaakov, Beer-Sheva (IL)

(73) Assignee: Ben-Gurion University of the Negev Research & Development Authority, Beer-Sheva (IL)

( * ) Notice: Subject to any disclaimer, the term of this patent is extended or adjusted under 35 U.S.C. 154(b) by 0 days.

(21) Appl. No.: 09/754,960

(22) Filed: Jan. 5, 2001

Related U.S. Application Data (63) Continuation of application No. PCT/IL99/00380, filed on Jul. 12, 1999.

(30) Foreign Application Priority Data

Jul. 13, 1998 (IL) .................................................. 125328

(51) Int. Cl.$^7$ .............................. H02M 7/06; H02J 1/02
(52) U.S. Cl. ............................................ 363/39; 363/89
(58) Field of Search ............................... 363/39, 84, 89, 363/125

(56) References Cited

U.S. PATENT DOCUMENTS

| | | |
|---|---|---|
| 3,767,941 A | 10/1973 | Crawford |
| 4,533,986 A | 8/1985 | Jones |
| 4,533,988 A * | 8/1985 | Daly et al. .................. 363/127 |
| 5,038,267 A | 8/1991 | De Doncker |
| 5,047,912 A | 9/1991 | Pelly |
| 5,282,126 A | 1/1994 | Husgen |
| 5,530,635 A | 6/1996 | Yashiro |
| 5,550,463 A | 8/1996 | Coveley |
| 5,568,041 A | 10/1996 | Hesterman |
| 5,633,579 A | 5/1997 | Kim |
| 5,686,798 A | 11/1997 | Mattas |
| 5,742,151 A | 4/1998 | Hwang |
| 5,798,635 A | 8/1998 | Hwang et al. |
| 5,912,549 A | 6/1999 | Farrington et al. |
| 5,920,471 A | 7/1999 | Rajagopalan et al. |

FOREIGN PATENT DOCUMENTS

| | | |
|---|---|---|
| DE | 26 49 385 | 5/1978 |
| DE | 196 41 299 | 4/1998 |
| EP | 0 351 144 | 1/1990 |
| EP | 0 516 377 | 12/1992 |
| EP | 0 593 258 | 4/1994 |
| EP | 0 859 453 | 8/1998 |
| EP | 0 895 339 | 2/1999 |

OTHER PUBLICATIONS

R. Streit et al, "High Efficiency Telecom Rectifier Using a Novel Soft–Switched Boost–Based Input Current Shaper", *Intelec 91*, Nov. 1991.

Ionel Dan Jitaru, "Soft Transitions Power Factor Correction Circuit", *High Frequency Power Conversion 1993*, May 27, 1993.

(List continued on next page.)

Primary Examiner—Adolf Deneke Berhane
(74) Attorney, Agent, or Firm—Altera Law Group LLC (57) ABSTRACT

Modular apparatus for regulating the harmonics of current drawn from power lines by electric equipment, comprising a first rectifier circuit module, consisting of an array of rectifying diodes; a second Switch and Controller Assembly (SCA) module, which comprises a power switch and controller and their interconnections; an input inductor for filtering the current drawn from the rectifier module; and an output capacitor, for filtering the output voltage ripple at the load. The inlet of the rectifier is connected to the power line and an outlet of the rectifier module is connected to the SCA. The inlet of said SCA is connected to the rectifier, via an inductor and the outlet of said SCA is connected to the output capacitor. The inlet of the inductor is connected to the rectifier, the outlet of the inductor is connected to the inlet of said SCA, and the capacitor is connected in parallel with the load.

19 Claims, 10 Drawing Sheets

OTHER PUBLICATIONS

Nasser H. Kutkut, "Design Considerations for Power Converters Supplying the SAE J-1773 Electric Vehicle Inductive Coupler", *IEEE*, Feb. 1997.

S. Ben Yaakov, "PWM Converters with Resistive Input", *IEEE Transactions on Industrial Electronics*, vol. 45, No. 3, pp. 519–520, Jun. 1998.

Patent Abstracts of Japan; vol. 199, No. 606, Jun. 28, 1996 & JP 08 047260 (Hitachi Ltd) Feb. 16, 1996.

Patent Abstracts of Japan; vol. 199, No. 808, Jun. 30, 1998 & JP 10 084674 (Sanken Electric).

\* cited by examiner

MODULAR STRUCTURE OF AN APPARATUS FOR REGULATING THE HARMONICS OF CURRENT DRAWN FROM POWER LINES BY AN ELECTRONIC LOAD

This application is a continuation of application Ser. No. PCT/IL99/00380, filed Jul. 12, 1999.

FIELD OF THE INVENTION

The present invention relates to the field of power electronics. More particularly, the invention relates to a method for regulating the harmonics of current drawn from power lines, by electric equipment, using modular design and construction techniques.

BACKGROUND OF THE INVENTION

The art has devoted a considerable effort to the problem of shaping the current amplitude and phase drawn from the power line, loaded by electric equipment. Switch Mode and Resonant Converters are widely used for DC—DC (Direct Current-Direct Current), DC-AC (Direct Current-Alternate Current), AC-DC and AC—AC conversion. In some applications, the purpose of power conversion is to shape the current at the input of the converter. For example, an input power stage known in the art as an Active Power Factor Correction (APFC) circuit, the function of the converter is to insure that the AC current supplied from the source (power line) will appear in almost the same shape and phase as the source voltage. Thus, a Power Factor (PF) of unity is obtained.

The need for APFC stages is driven by the worldwide concern about the quality of power supplies. Generally, poor power factors results is several problems, comprising low efficiency of power transmission, interference to normal operation of other units connected to the same power line, as well as distortion of the voltage shape. Voluntary and mandatory standards that restrict the acceptable level of the current harmonics generated by the loading equipment, have been adopted by many countries, so as to maintain high power quality.

Another advantage of APFC is increased power levels that may be drawn from the power line. Looking at the spectral components of the current without APFC, only the fundamental (first) harmonic component contributes to the real load power. The root mean square (rms) magnitude of the current is increased beyond the level of the fundamental magnitude, as a result of higher order harmonics. Since the operation of protection elements, such as fuses and circuit breakers, is affected by the rms current, increased rms level limits the maximum power level that may be drawn from the line. Using electric equipment with APFC enables the rms current level to be equal to the level of the fundamental harmonic. Hence, the power that may be drawn from the line may reach its maximum theoretical level.

From the above description, it is clear that the need for APFC is wide spread, and economic implementation of APFC circuitry is of prime importance. Moreover, the cost of APFC circuits is of great concern considering the fact that APFC cost is an add-on expense to the functionality of the original equipment. As a result, APFC units should be constructed using methods that are economic during production, and are easy to integrate in any existing equipment.

Some known methods for physical implementation of APFC stages, sub-circuits, which are part of the electrical circuit of the (loading) equipment are used. In this case, the designer of this equipment engages passive and active components, as well as Integrated Circuits (ICs) to construct the desired APFC stage. Normally, designs that involve many components suffer from several drawbacks, like relatively high cost and low reliability. Moreover, these designs require many wiring connections, resulting in relatively high susceptibility to Electro-Magnetic Interference (EMI), "ground noise" and other engineering disadvantages.

Other construction methods comprise one "block" (APFC block) that includes all the components and circuitry of an APFC stage. This implementation provides functional solution to the design problem from the electrical aspect, but still requires satisfactory heat dissipation design. Still, a separate APFC unit should be normally purchased from another manufacturer (which is more skilled in this kind of products), leading to higher cost. Another disadvantage is the fact that this realization is not compatible with IC technology, which normally has the benefit of low cost in mass production. Further problem using APFC block is the fact that in this implementation, all heat dissipating components, such as the main switch, diodes and the inductor are close to each other. This proximity leads to a severe heat dissipation problem, which may limit the power handling capability of such module. Additionally, because of this component proximity, EMI restrictions require heavy snubbing, shielding and filtering, all leading to complexity, higher cost and lower efficiency.

U.S. Pat. No. 5,530,635 to Yashiro describes a power supply divided into a noise filtering module, one or more power factor and harmonic correction modules, one or more DC—DC converter modules and a backup power supply for the power converter modules. Each module may optionally be combined so as to construct a desirable power supply according to various required specifications. However, this construction lacks simplicity, since it is not realizable using IC technology and in addition is not advantageous with respect to optimal heat dissipation.

U.S. Pat. No. 5,047,912 to Pelly describes a modular four terminal realization of APFC stages. The control circuit comprises a signal differentiator, for generation of a reference signal to the feedback loop of the circuit. Differentiators are known in their extreme noise sensitivity, which may corrupt the output signal. Switching circuits such as Pulse Width Modulation (PWM) Boost converters, which are characterized by high frequency noise injection, are also problematic to use. Another problem arises from this patent is the reference feedback signal is driven from the line voltage, which contains additive noise that distorts the shape of the desired controlled line current.

A different problem, which is not solved by U.S. Pat. No. 5,047,912 is the generation of a local power supply (from the line voltage) for the control circuitry. High power APFC stages requires local power supplies of several watts. Using an external power supply for this purpose requires additional circuitry and pin connection, which increase cost. Another approach is to drive the power supply from a voltage divider from of the output voltage, or from the voltage across the main switch. This approach is extremely inefficient, especially in case of high power applications.

Another disadvantage of U.S. Pat. No. 5,047,912 is the need for fast diodes for its input rectifier, due to the fact that the line rectifier in this patent is locate after the input inductor. At this point, the signals are switching frequency signals that requires fast rectifier diodes, so as to eliminate high power loss. Using fast diodes introduces higher switching noise, as well as higher cost (since such diodes are more expensive).

All the methods described above have not yet provided satisfactory solutions to the task of constructing simple, low-cost, modular APFC stages.

It is an object of the invention to provide an APFC unit, for regulating the harmonics of power line current, that comprise low number of components.

It is another object of the invention to provide a compact, low cost APFC unit.

It is another object of the invention to provide a compact APFC unit, with a minimal amount of interconnections.

It is still another object of the invention to provide an APFC unit with efficient local power supply feeding switching and control circuit.

It is yet another object of the invention to provide an APFC unit which is compatible with IC technology.

It is yet another object of the invention to provide an APFC unit which do not comprise signal differentiation, while overcome the drawbacks of the prior art.

Other purposes and advantages of the invention will appear as the description proceeds.

SUMMARY OF THE INVENTION

The invention is directed to construction of a modular apparatus for regulating the harmonics of current drawn from power lines by electric equipment. This apparatus comprises a first rectifier circuit module consisting of an array of rectifying diodes, the inlet of which is connected to the power lines; a second Switch and Controller Assembly (SCA) module for controlling said current to follow the voltage across said power lines by sampling the current drawn from said power lines and the output voltage of said second SCA. The second SCA module consists of a power switch and controller and their interconnections, the inlet of which is connected to the outlet of said first rectifier circuit module through at least one serially connected input inductor, for filtering the current drawn from the rectifier module; and at least one output capacitor connected in parallel with the output of said SCA and said load, for filtering the output voltage ripple at said load.

Preferably, the main power factor correction operation is carried out by the SCA module. Correction is obtained by a high frequency controlled switching of the input rectified voltage. Further rectification is carried out by a high frequency rectifier diode connected in series with the SCA outlet. The control circuit samples both the input current and the output voltage of the SCA and controls the switching transistor accordingly by an inherent pulse width modulator responsive to the control signal. The control circuit is fed by a power supply via an inlet in the SCA module. Preferably, optional soft switching is obtained using an integrated turn-on snubber, consists from an inductor, a capacitor and two rectifier diodes, connected between the input and output of the SCA. These two diodes are integrated into the SCA module.

Preferably, the SCA module contains only semiconductor components, so as to be fabricated as a monolithic integrated circuit for low power applications, or as a hybrid circuit for medium and high power applications, in both cases packaged in a three terminal or two port heat dissipating package. Using this construction, increased power handling capability is obtained. This construction also reduces the number of interconnections required for integration, as well as reducing the unit cost of mass production. Passive components required for SCA operation, like inductors and some of the capacitors, which can not be fabricated as semiconductor products are connected via suitable inlets in the SCA package in case of monolithic design, or within the module in case of hybrid design.

Preferably, the proposed construction enables separate mounting of modules and components in a manner that is optimal to heat dissipation. Interconnections between different terminals of models or components of this construction are provided using wires and/or conductive traces on a printed circuit board or on an alumina substrate, reducing the labor associated with low cost construction. The apparatus further comprises an internal power supply driven from the output voltage or from the switched voltage of the SCA module.

BRIEF DESCRIPTION OF THE DRAWINGS

The above and other characteristics and advantages of the invention will be better understood through the following illustrative and none-imitative detailed description of preferred embodiments thereof, with reference to the appended drawings, wherein.

DETAILED DESCRIPTION OF PREFERRED EMBODIMENTS

Figure 1:
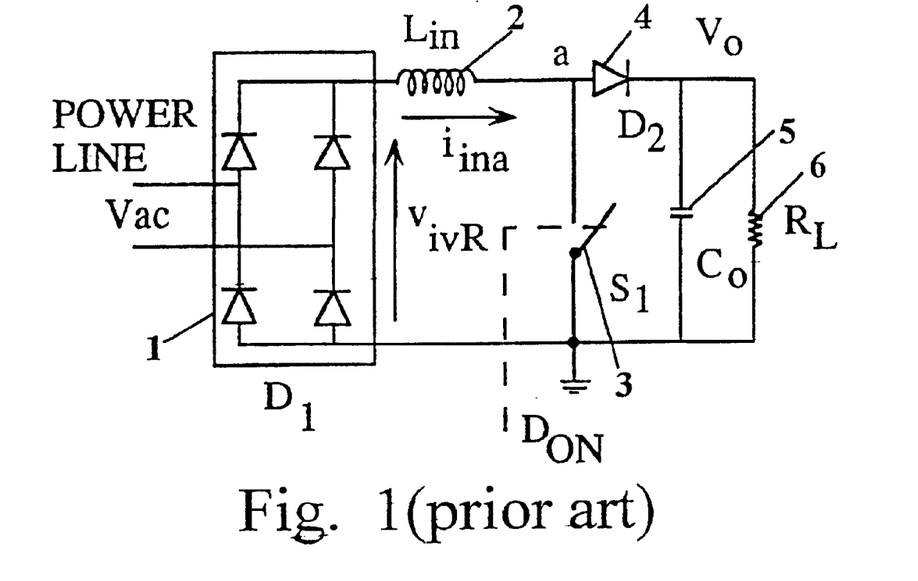
FIG. 1 is a schematic diagram of a conventional (prior art) PWM boost converter.

For a better understanding of the present invention, the structures of prior art are examined, according to the illustrations presented by FIGS. 1 to 5. A typical prior art implementation of APFC stage, known as PWM boost converter, is shown in FIG. 1. The input AC voltage is rectified by an array 1, of four rectifying diodes, and fed into a boost stage that comprises an input inductor 2 ($L_{in}$), a switch 3 ($S_1$), a high frequency rectifier 4 ($D_2$), an output filtering capacitor 5 ($C_0$) and a load, represented by a resistor 6 ($R_L$). Switch 3 is driven by a high frequency control signal with duty cycle D, such that the shape of the input current $i_{in}$ follows the shape of the rectified input voltage $V_{ivR}$. Consequently, the input terminal (before the inductor 2) will have resistive characteristics, i.e., the Power Factor (PF) equals unity.

Figure 2:
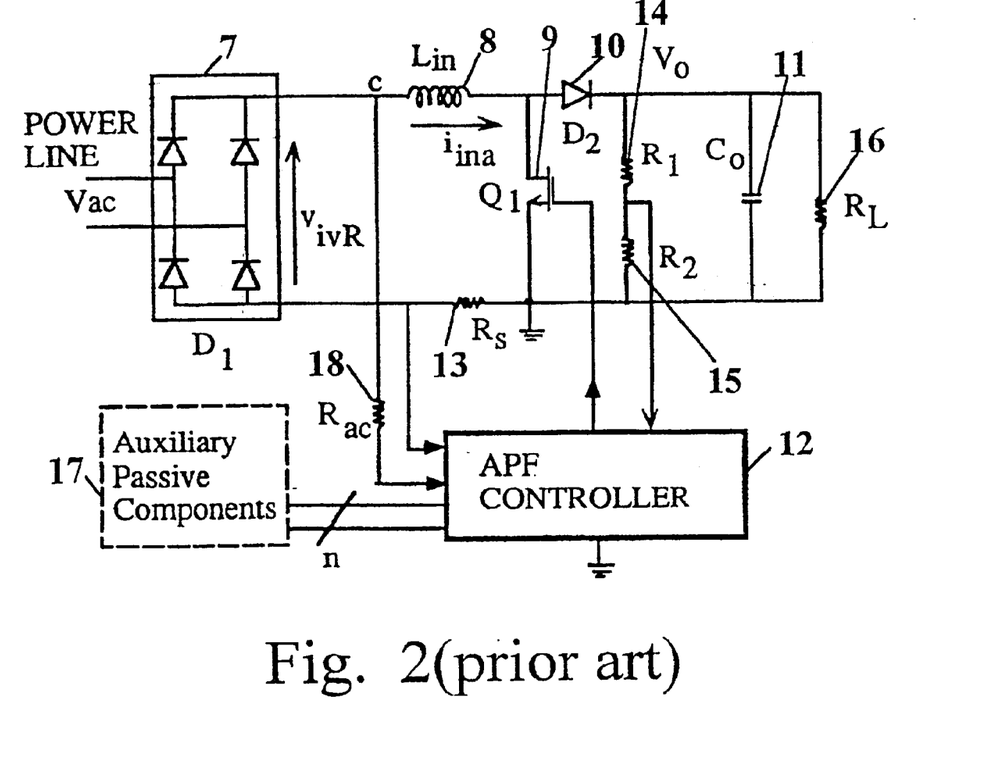
FIG. 2 is a schematic diagram of a conventional (prior art) APFC stage.

Another prior art implementation, shown in FIG. 2, comprises both passive and active components. The input AC voltage is rectified by an array 7, of four rectifying diodes, and fed into a boost stage that comprises an input inductor 8 ($L_{in}$), a power Metal Oxide Semiconductor Field Effect Transistor (MOSFET) switch 9 ($Q_1$), a high frequency rectifier 10 ($D_2$), an output filtering capacitor 11 ($C_0$), a load, represented by a resistor 16 ($R_L$), an IC Active Power Factor (APF) controller 12 with its auxiliary passive components circuit 17, a current sensing resistor 13 ($R_s$), a voltage sensing resistor 18 ($R_{ac}$),and an output voltage divider, constructed from resistors 14 ($R_1$) and 15 ($R_2$). MOSFET switch 9 is driven by a high frequency control signal from the APF controller 12. Here, some components (such as inductor 8 and capacitor 11) are of relatively large size, which is not compatible with microelectronics technology. Other silicon semiconductors, such as APF controller 12 and rectifier 10 may be fabricated on a monolithic IC chip. However, the stage of FIG. 2 still comprises many discrete components with their associated wiring, that preclude the streamlining of the APFC stage. For example, the rectified input voltage $V_{ivR}$ should be sensed, and hence a wire should be connected between the feed point "c" and the controller 12. In order to regulate the output voltage, the voltage at point "b" (the output of the voltage divider $R_1$, $R_2$) is also sensed by the controller 12.

Figure 3:
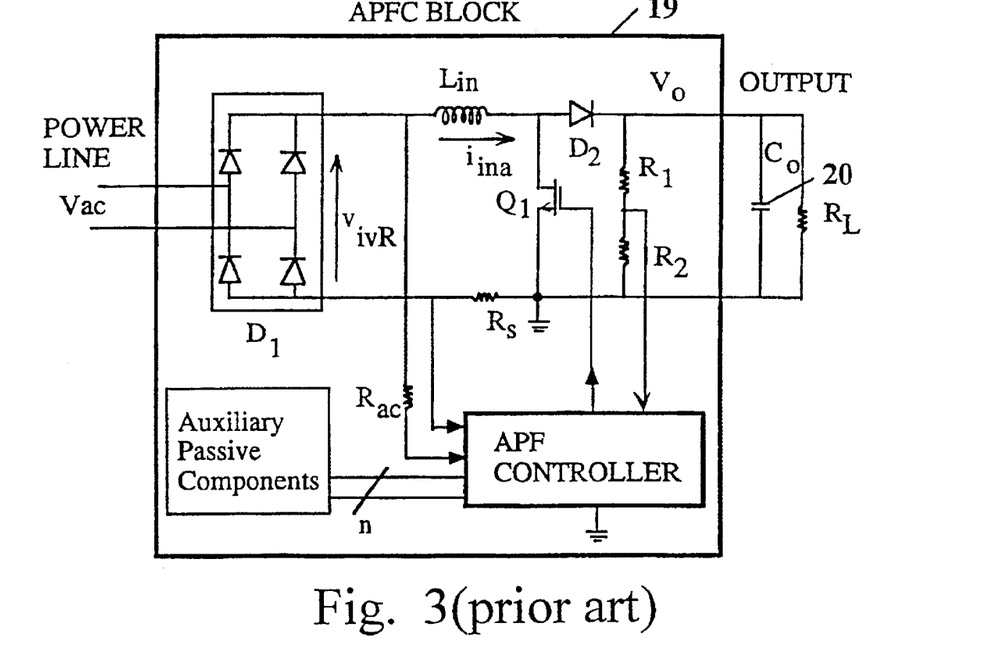
FIG. 3 is a schematic diagram of a conventional (prior art) APFC stage in one block.

Another prior art, comprising a complete stage, similar to the stage of FIG. 2, (excluding the output filtering capacitor 20) packaged into one APFC block 19 is shown in FIG. 3. Here, all heat dissipating elements are in close proximity, complicating heat removal.

Figure 4:
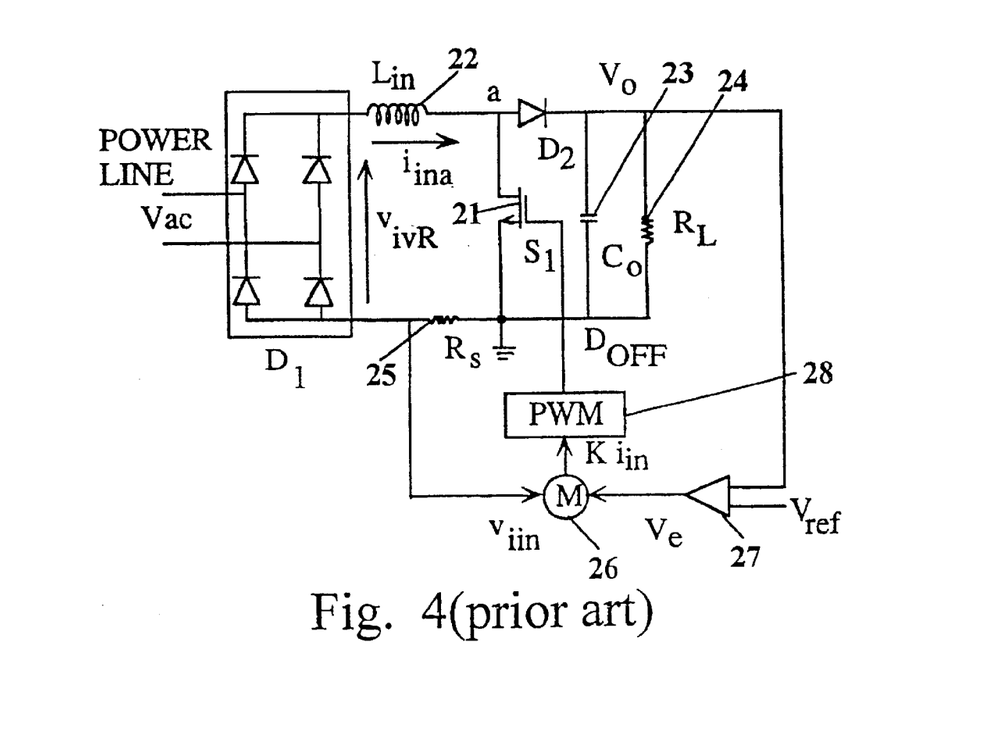
FIG. 4 is a schematic diagram (prior art) of a control circuit of an APFC stage.

In an improved prior art APFC stage, illustrated in FIG. 4, comprises a modified control operation, in which sensing of the input voltage $V_{ivR}$ is not required. The voltage $V_a$ at point "a" is a pulsating voltage of maximum amplitude $V_0$ and duration of $T_{OFF}$ when switch 21 ($S_1$) is not conducting. Consequently, the average voltage at point "a" $v_{av}$ is given by:

$$v_{av} = \frac{V_0 \cdot T_{OFF}}{T_s} \quad [Eq. 1]$$

where $T_s$ is the PWM switching period, or:

$$v_{av} = V_0 \cdot D_{OFF} \quad [Eq. 2]$$

where $$D_{OFF} = \frac{T_{OFF}}{T_S} \quad [Eq. 3]$$

Similarly, the "on" duty cycle $D_{ON}$ while $S_1$ is conducting (a period of $T_{ON}$) is given by:

$$D_{ON} = \frac{T_{ON}}{T_S} \quad [Eq. 4]$$

The input voltage $V_{ivR}$ fed into the boost converter is assumed to be of low frequency, compared to the switching frequency $f_s$ ($f_s=1/T_s$), and hence may be considered constant during one or several switching periods. If the power stage is properly controlled, the average low frequency voltage across inductor 22 ($L_{in}$) is almost zero (otherwise the current would risen to large values). Thus:

$$v_{ivR}=v_{av} \quad [Eq. 5]$$

where $v_{ivR}$ is the instantaneous low frequency component of $V_{ivR}$.

From Eq. 1 and Eq. 5, the following equality is obtained:

$$v_{ivR}=V_0 \cdot D_{OFF} \quad [Eq. 6]$$

In case when $D_{OFF}$ is programmed according to the following rule:

$$D_{OFF}=K \cdot i_{ina} \quad [Eq. 7]$$

where K is a constant, and $i_{ina}$ is the low frequency component of the input current $i_{in}$, then:

$$v_{ivR}=V_0 \cdot K \cdot i_{ina} \quad [Eq. 8]$$

or:

$$i_{ina} = \frac{v_{ivR}}{V_0 \cdot K} \quad [Eq. 9]$$

If the filtering capacitor 23 ($C_0$) is sufficiently large so that the ripple of the output voltage $V_0$ may be neglected, then according to Eq. 9 the input current follows the input voltage. Hence, the converter stage looks resistive with the following input resistance:

$$Re=K \cdot V_0 \quad [Eq. 10]$$

From Eq. 10, the value if the input resistance $R_e$ as well as the input current may be controlled by adjusting the value of K. Practically, the output voltage should remain constant even for variations in the load 24 ($R_L$). This may be obtained by establishing a closed control loop on K. The voltage $v_{iin}$, which is proportional to the input current ($i_{ina}$) sensed by the sensing resistor 25 ($R_s$), is fed into a multiplier 26 (M). An error amplifier 27, compares the output voltage $V_0$ with a reference voltage $V_{ref}$, generating an error voltage $V_e$, which is also fed into the multiplier 26. The product $v_{iin} \cdot V_e$, which is proportional to $i_{ina}$ by the factor K, is fed into a PWM modulator 28, which generates the duty cycle pulse ($D_{OFF}$) according to Eq. 7.

Figure 5:
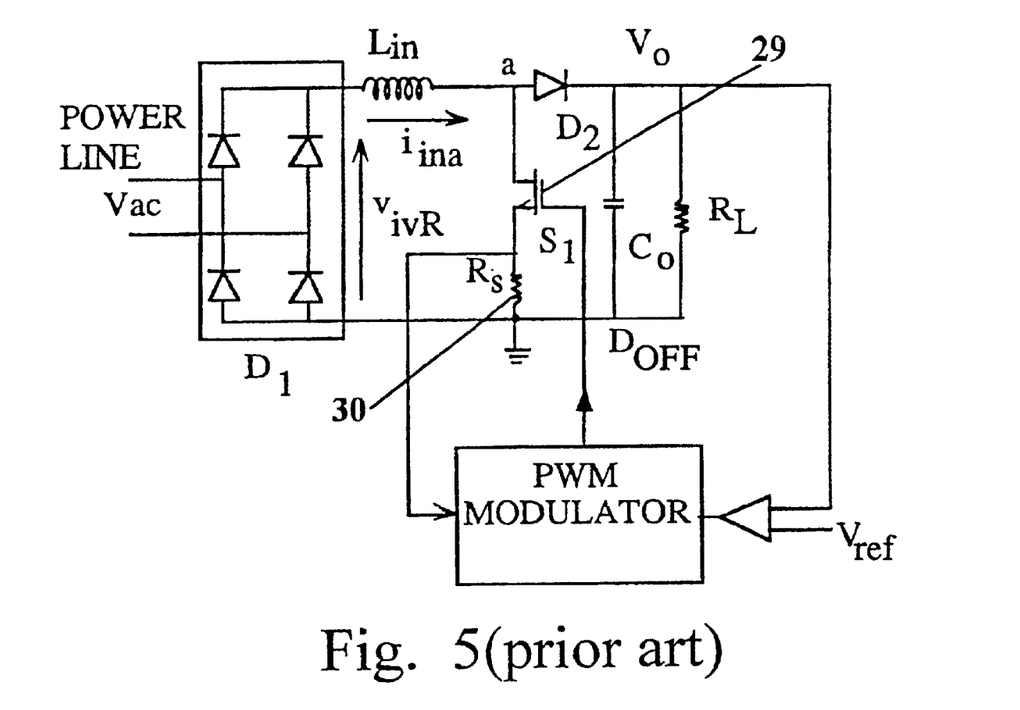
FIG. 5 is a schematic diagram (prior art) of another control circuit of an APFC stage.

Another improved prior art APFC stage, illustrated in FIG. 5, exploits the current flowing in the MOSFET switch 29 to generate the duty cycle pulse ($D_{OFF}$). The sensing resistor 30 ($R_s$) is placed in series with the MOSFET switch 29, whereas the voltage across it is being used to measure the input current $i_{ina}$. This implementation, as well as the implementation described in FIG. 4 above, do not require input voltage sensing, lowering the number of the required interconnections.

Figure 6:
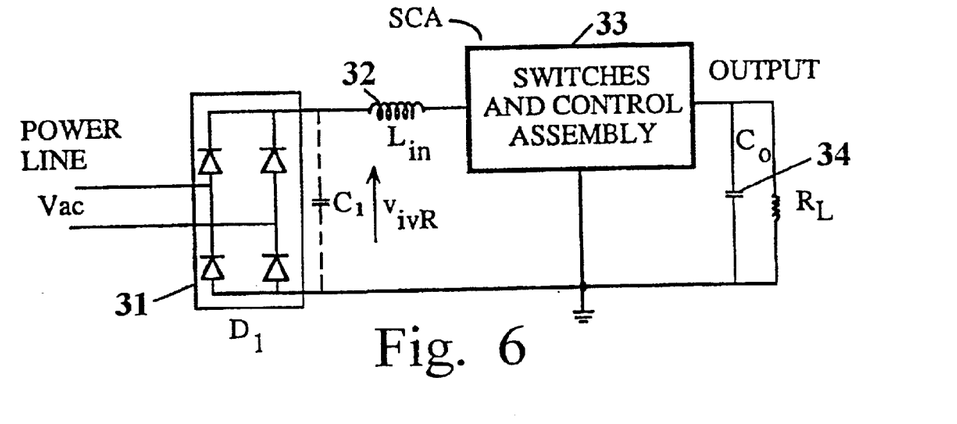
FIG. 6 is a schematic diagram of a modular construction of an APFC stage, according to the present invention.

According to one preferred embodiment of the present invention, the APFC stage comprises four basic sub-circuits, two modules and two structural elements, being connected to each other as illustrated in FIG. 6. The first module consists from a widely used input rectifier array 31 ($D_1$). This module has one inlet connected to the power line and one DC outlet. This inlet is normally pre-filtered by a conventional noise filter to suppress noise entering from the line. A capacitor ($C_1$) may be optionally connected across the rectifier array output so as to filter high frequency components of the rectified voltage to ground. The first structural element is the input inductor 32 ($L_{in}$), which may tapped and may consist from additional inductor, in case when a snubber is used. This inductor is being connected between the rectifier module and the SCA module.

The second module is the Switch and Control Assembly (SCA) 33, consists from all the semiconductor components of the switching, control, rectifier and power supply circuitry. The inlet of this module is being connected to the output of the first module 31 via the input inductor 32 ($L_{in}$), and the outlet to the load. The SCA module may optionally comprise a turn-on snubber. According to the invention, the SCA module may have three terminals, one for input, one for output and one for ground.

The second structural element is the output capacitor 34 ($C_0$), being connected across the outlet of the SCA, in parallel with the load. This modular construction is simpler than prior art implementations, with very few interconnections and with a simple forward flow of power and signals. In addition, the physical location of the three power dissipating elements, the input rectifier array 31 ($D_1$), the input inductor 32 ($L_{in}$), and the SCA 33 is not critical, so they may be mounted separately, with the best possible heat removal.

Figure 7:
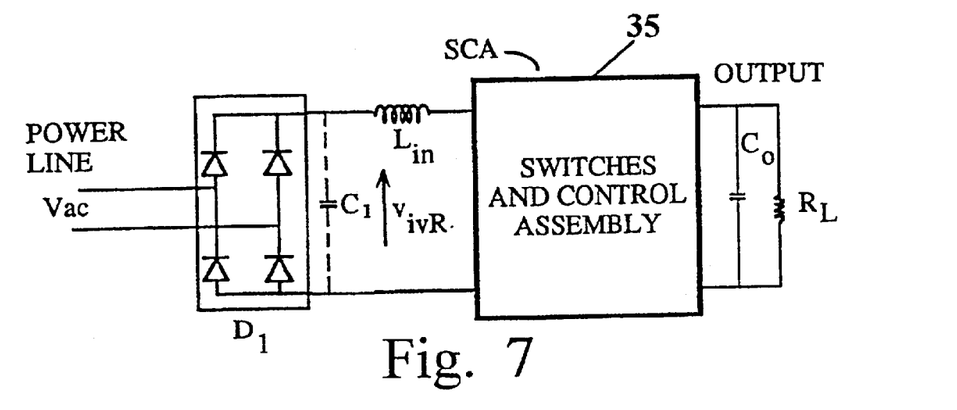
FIG. 7 is a schematic diagram of a modular construction of an APFC stage, as a two-port network.

FIG. 7 illustrates a different construction, according to another preferred embodiment of the present invention. In this implementation, SCA 35 is connected to the same construction described if FIG. 6 above, but as a two port network. This construction provides sensing of the input current within the SCA, thereby simplifying the control circuitry.

Figure 8:
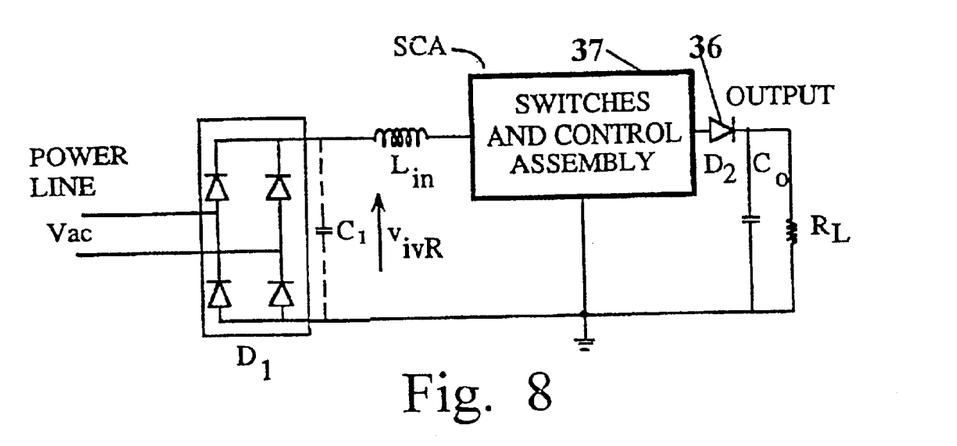
FIG. 8 is a schematic diagram of the construction illustrated in FIG. 6, with improved heat dissipation.

According to another preferred embodiment of the present invention, the high frequency output rectifier diode 36 ($D_2$) is separated from SCA 37, as shown in FIG. 8. This construction allows better cooling and mounting.

Figure 9:
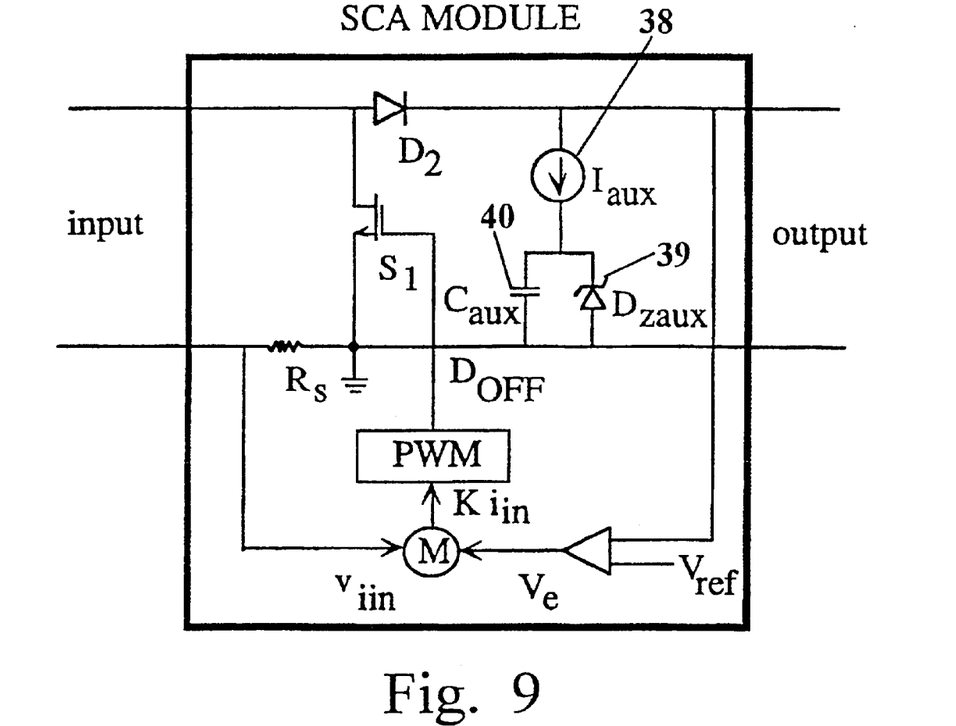
FIG. 9 is a schematic diagram of a Switch and Control Assembly (SCA), according to the present invention.

The SCA may by realized differently with respect to its internal circuitry, packaging and production technology. FIG. 9 illustrates a typical realization of an SCA circuitry, according to the invention, where all microelectronics compatible components are grouped together. The internal power supply ($V_{CC}$) required for SCA operation may be obtained from the output voltage using an auxiliary circuit, which comprises a current source 38 ($I_{aux}$), a zener diode 39 ($Dz_{aux}$) for power supply stabilization, and a smoothing capacitor 40 ($C_{aux}$). In case of high power applications, the smoothing capacitor 40 ($C_{aux}$) may be an electrolytic capacitor located outside the SCA module. This SCA implementation employs a typical PWM modulator, controlled by a control circuit as described above with reference to FIG. 4.

Figure 10:
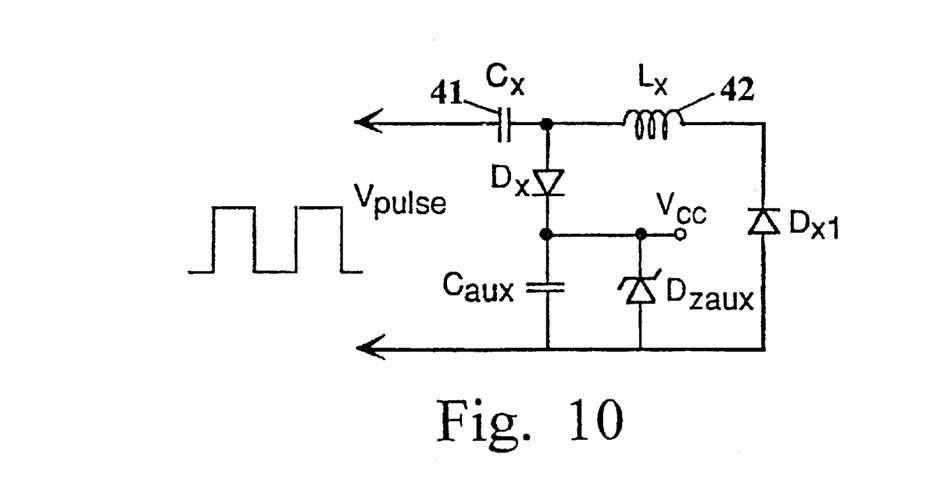
FIG. 10 is a schematic diagram of a resonant local power supply for the SCA, according to the present invention.

According to the invention, a different internal power supply for high power modules is constructed, as shown in FIG. 10. A charge pump capacitor ($C_x$) is connected in series with the positive terminal of the pulsating voltage, which may be the drain of the switching transistor. A rectifying diode ($D_x$) is connected in series with the output of the charge pump capacitor. A zener diode ($D_{Zaux}$) for power supply output voltage stabilization is connected between the rectifier diode ($D_x$) and ground. A smoothing capacitor ($C_{aux}$) is connected in parallel with the zener diode ($D_{Zaux}$). An inductor ($L_x$) is connected in series with another rectifier diode ($D_{x1}$), between the second terminal of the charge pump capacitor ($C_x$) and ground.

According to one preferred embodiment of the invention, power supply output voltage is stabilized by a fixed or adjustable voltage regulator, instead of using the zener diode $D_{Zaux}$. This voltage regulator provides better ripple rejection at the output. The voltage regulator input is connected to the cathode of the rectifying diode $D_x$, the common terminal is connected to ground and the power supply output voltage is taken from the voltage regulator output, filtered by the smoothing capacitor $C_{aux}$.

The input of the internal power supply circuit may be connected to a pulsating source ($V_{pulse}$), such as the voltage $V_a$ defined in FIG. 4 above. For each rising edge of the square-wave input, the charge pump capacitor 41 ($C_x$) delivers a constant charge, $Q_{x1}$, to the output $V_{CC}$, which is given by:

$$Q_{x1} = V_p \cdot C_x \quad \text{[Eq. 11]}$$

where $V_p$ is the magnitude of $V_{pulse}$ and $C_x$ is the capacitance of capacitor 41. Thus, for a switching frequency of $f_s$, the current $I_{CC1}$, fed into $V_{CC}$ terminal by the discrete charges $Q_{x1}$ is given by:

$$I_{CC1} = V_p \cdot C_x \cdot f_s \quad \text{[Eq. 12]}$$

$C_x$ is charged to the voltage $V_p - V_{CC}$, according to the charge transfer. When $V_{pulse}$ becomes zero, the charge pump capacitor 41 ($C_x$) together with the inductor 42 ($L_x$) form a resonant circuit, which charges capacitor 41 ($C_x$) until the voltage across it reaches $-V_{CC}$. At that moment, the current of inductor 42 ($L_x$) flows into $V_{CC}$ terminal until the current decays to zero. The energy transferred from capacitor 41 ($C_x$) to $V_{CC}$ is given by:

$$Ecc2 = \frac{(Vp - Vcc)^2 - Vcc^2}{2} \cdot Cx \quad \text{[Eq. 13]}$$

and the current $I_{CC2}$ delivered to $V_{CC}$ is given by:

$$Icc2 = \frac{(Vp - Vcc)^2 - Vcc^2}{2 \cdot Vcc} \cdot Cx \cdot fs \quad \text{[Eq. 14]}$$

From Eq. 13 and 14, the total current $I_{CC}$ flowing into $V_{CC}$ is given by:

$$Icc = Icc1 + Icc2 = \left\{ Vp \cdot Cx + \frac{(Vp - Vcc)^2 - Vcc^2}{2 \cdot Vcc} \cdot Cx \right\} \cdot fs \quad \text{[Eq. 15]}$$

The SCA resonant power supply described in FIG. 10, is of high efficiency, since most of the energy flowing in its reactive elements is recovered.

Figure 11:
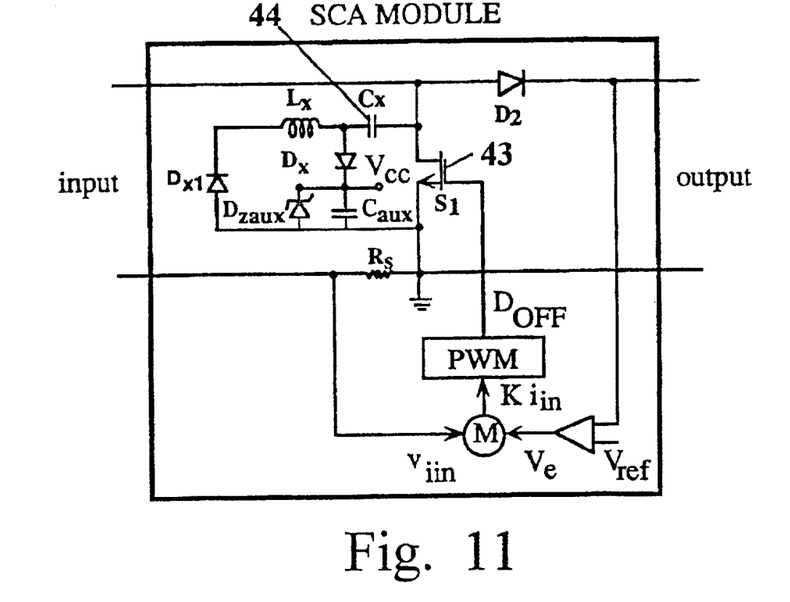
FIG. 11 is a schematic diagram of a resonant local power supply integrated into the SCA, according to the present invention.

FIG. 11 illustrates an integration of the resonant power supply described in FIG. 10 into the SCA module, according to a preferred embodiment of the invention. Such integration improves the operation of the boost power stage, by providing a "soft switching" to switch 43 ($S_1$). Capacitor 44 ($C_x$) functions as a turn-off snubber for the switch, by slowing the rate of voltage developed across the switch. The overlapping time, when both voltage across the switch, and current through the switch are present, is reduced, reducing the switching losses. Moreover, since capacitor 44 ($C_x$) is charged (and discharged) by a current source (which is actually the inductor $L_{in}$ in FIG. 1), the charging (and discharging) process is almost lossless, resulting in an improved efficiency.

Figure 12:
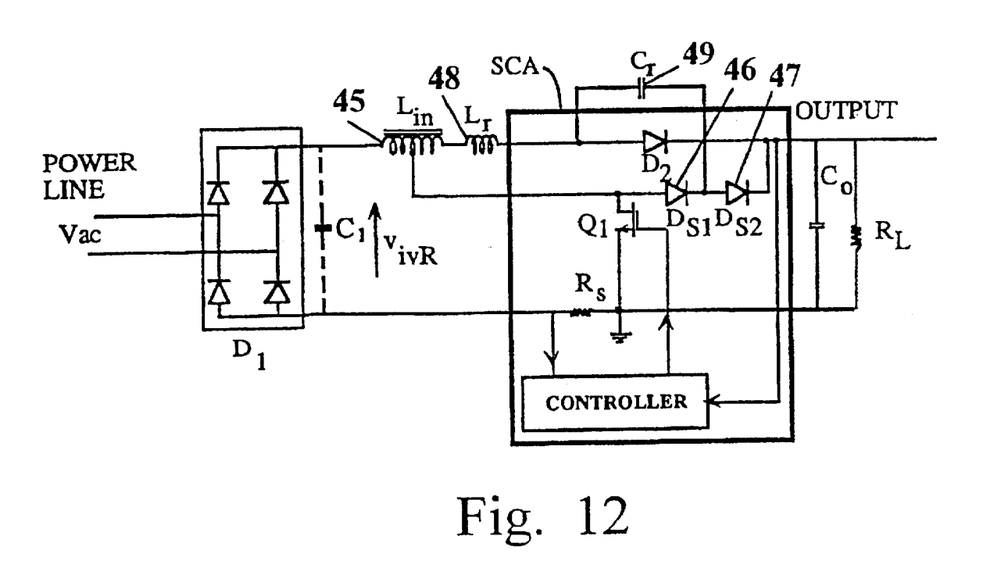
FIG. 12 is a schematic diagram of an SCA with a lossless snubbing circuitry, according to the present invention.

According to another preferred embodiment of the present invention, a further improved APFC stage may be constructed, by adding a turn-on snubber to the circuit. This approach is illustrated in FIG. 12. The tapped inductor 45 ($L_{in}$), diodes 46 ($Ds_1$) and 47 ($Ds_2$), together with snubber elements (inductor 48 [$L_r$], and capacitor 49 [$C_r$]) reduce the switching losses during turn-on time. Still, the modular design presented in the invention is retained, even after adding the described snubbing circuitry or any other snubbing circuitry.

Figure 13:
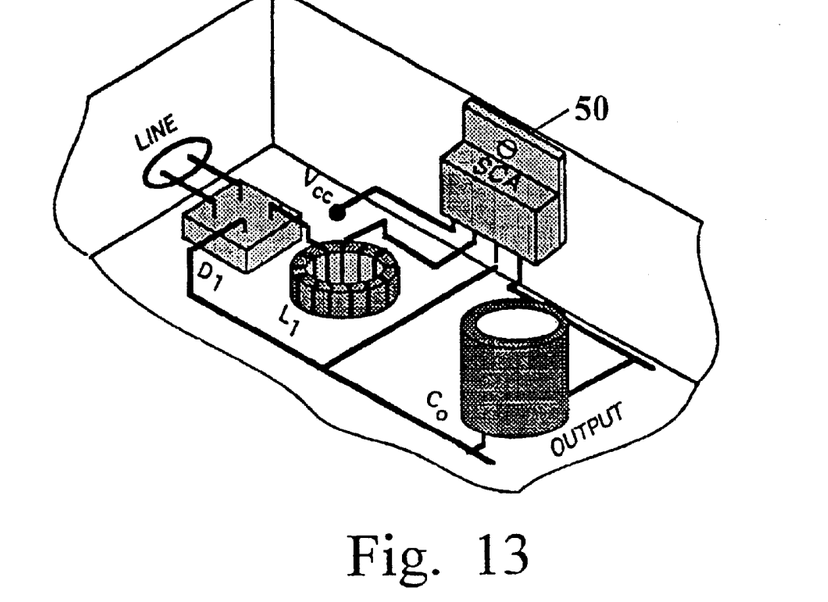
FIG. 13 illustrates the APFC stage of FIG. 6, constructed according to the present invention, where the SCA is fabricated as a four pin IC.

Production concept of SCA modules may vary according to the required quantities and power levels. FIG. 13 illustrates a construction of the APFC stage described in FIG. 6 above, according to a preferred embodiment of the invention. The SCA module is fabricated as a monolithic (chip) IC, packaged in a four pin package 50. This construction is suitable mainly for low power applications.

Figure 14:
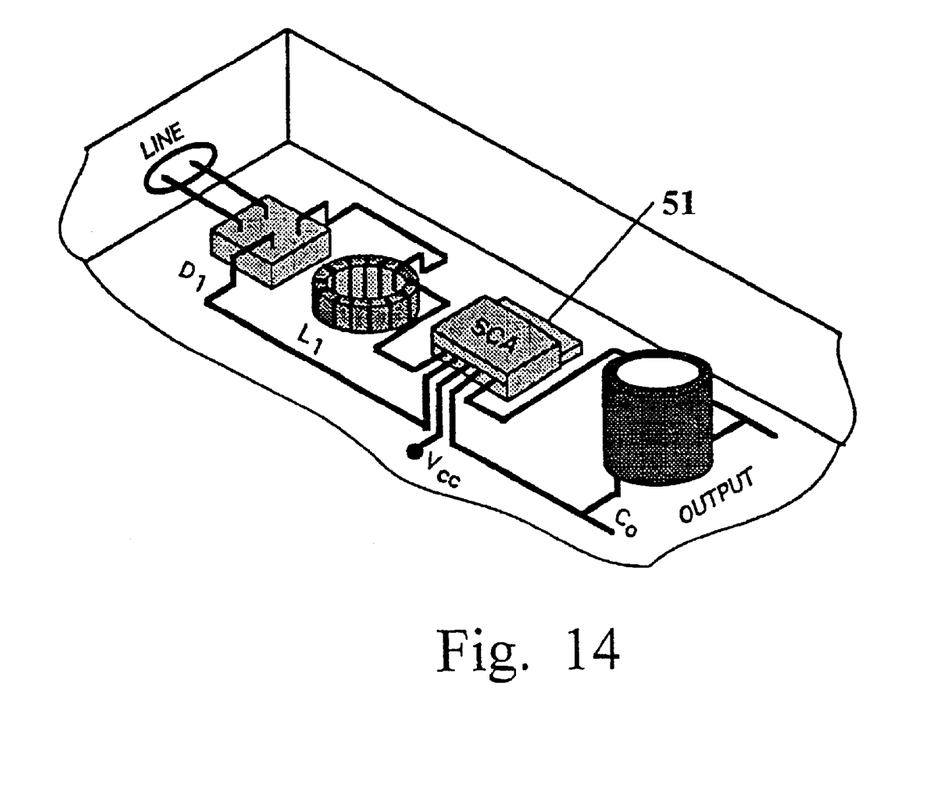
FIG. 14 illustrates the APFC stage of FIG. 7, constructed according to the present invention, where the SCA is fabricated as a five pin IC.

FIG. 14 illustrates construction of the APFC stage described in FIG. 7 above, according to another preferred embodiment of the invention. Here too, the SCA module is fabricated as a monolithic (chip) IC, packaged in a five pin package 51. This construction as well, is suitable mainly for low power applications.

Figure 15:
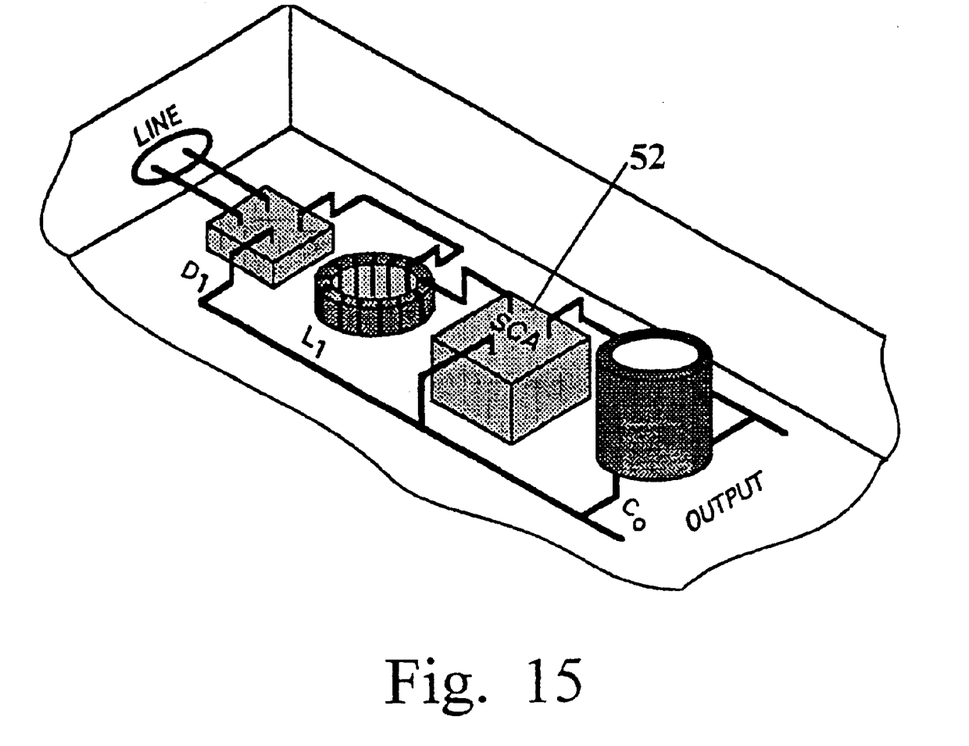
FIG. 15 illustrates an APFC stage, constructed according to the present invention, where the SCA is fabricated using hybrid technology.

FIG. 15 illustrates construction of the APFC stage, according to another preferred embodiment of the invention. The SCA module is fabricated as a multi-chip hybrid circuit, packaged in a three pin package 52, with an associate Printed Circuit Board (PCB) based sub-assembly 53. This construction is suitable mainly for medium and high power applications.

In case when the user prefers to use an (already) available power supply, an extra pin for external power supply may be easily provided, as shown in FIGS. 13 and 14 above. However, the main feature is related to minimal number of interconnections between the SCA module and other components.

EXAMPLE 1

Figure 16:
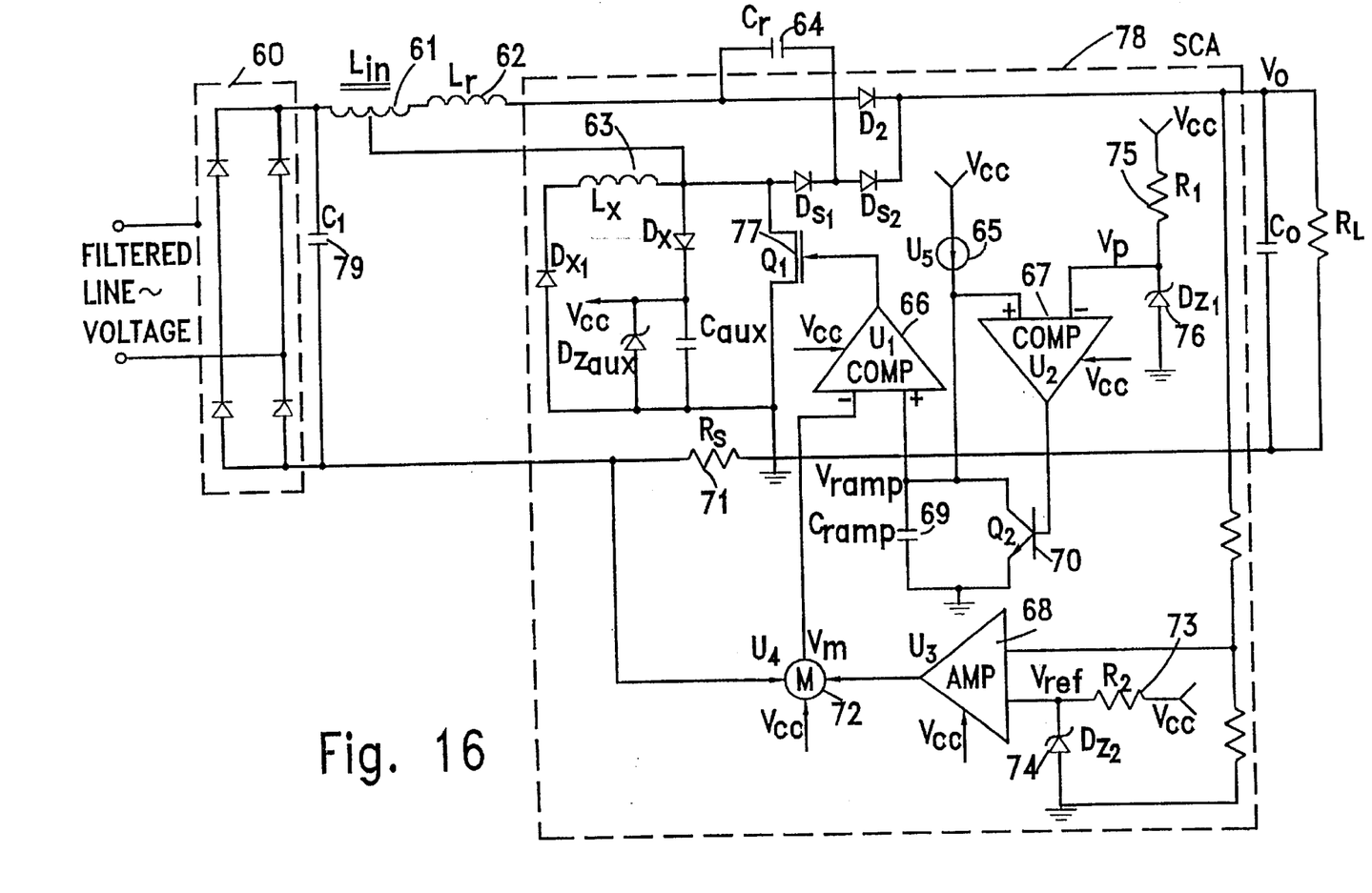
FIG. 16 illustrates an APFC stage, constructed according to the present invention, where the SCA is constructed in a manner suitable for hybrid IC technology.

FIG. 16 is a complete schematic diagram of an APFC stage structure, where the SCA module 78 includes internal power supply and turn-on snubber circuits, according to the invention, and is fabricated as a multi-chip hybrid circuit. The rectifier array is contained in a separate module 60. The input inductor 61 ($L_{in}$), which in this case is a tapped inductor, as well as the snubbing circuit inductor 62 ($L_r$), and the snubbing circuit capacitor 64 ($C_r$) are excluded from the SCA module, since they are not compatible with IC or hybrid technology. The control circuit controlling the switching transistor 77 ($Q_1$) is implemented using IC components. The voltage $V_{ref}$ is generated from $V_{CC}$ by a resistor $R_2$ and a zener diode $D_{z2}$, feeding the error amplifier 68 ($U_3$). The resulting error is fed into the multiplier 72 ($U_4$) together with the voltage across the sampling resistor 71 ($R_s$). The output voltage $V_m$ from the multiplier is fed into comparator 66 ($U_1$), together with a ramp voltage $V_{ramp}$, which varies between a peak value of $V_p$ and zero, thereby determining the switching frequency $f_s$ ($f_s=1/T_s$).

The peak value of the ramp voltage $V_p$ is determined from $V_{CC}$ by resistor 75 ($R_s$) and zener diode 76 ($D_{z1}$). A current source 65 ($U_5$) charges the capacitor 69 ($C_{ramp}$) to $V_{ramp}$. $V_{ramp}$ is fed together with $V_p$ into another comparator 67 ($U_2$), which discharges Cramp by driving transistor 70 ($Q_2$) for a short determined period whenever $V_{ramp}$ exceeds $V_m$. In this way, the time $T_{off}$ during which the switching transistor 77 ($Q_1$) is not conducting, is proportional to $V_m$, and hence, to the input current $i_{ina}$ (using Eq. 7 above). Using this construction, all the elements within the SCA module 78, ICs, semiconductors, resistors, capacitors and inductor 63 ($L_x$) may be integrated into one hybrid circuit.

EXAMPLE 2

Figure 17:
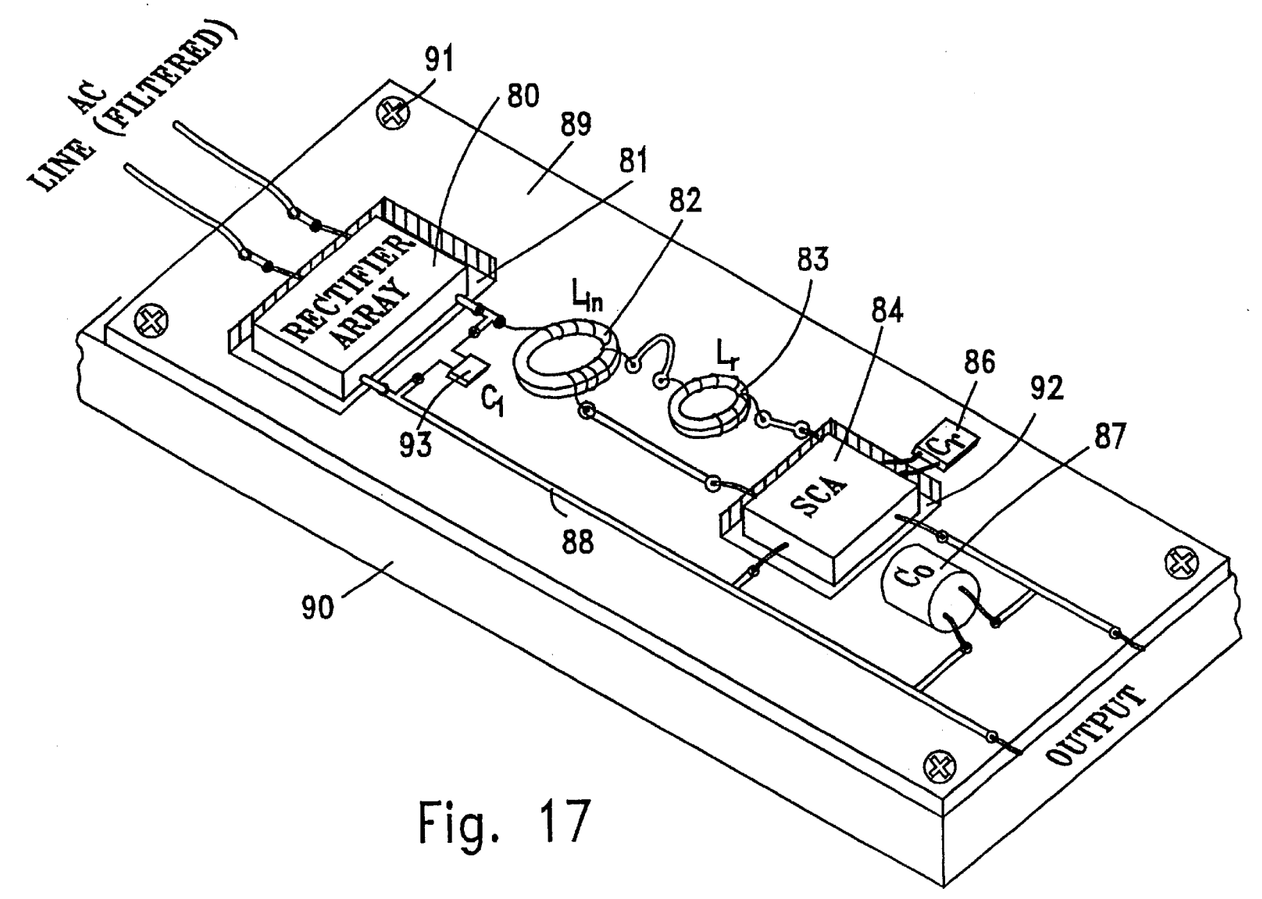
FIG. 17 illustrates a full APFC stage construction according to the present invention.

A full APFC stage construction presented by FIG. 16 is illustrated in FIG. 17. Both rectifier array 80, and SCA 84 modules are ICs and/or hybrid circuits, packaged each in a heat dissipating package (Alumina, for instance) with metallic leads, and mounted on heat-sink 90 by drilling suitable holes 81 and 92 in the PCB 89, respectively, by gluing with heat conductive adhesive or soldering. The PCB 89 is mounted to the case by using screw(s) 91, or by soldering.

Printed copper traces 88 are used to connect between terminals of different components. The input tapped inductor 82 ($L_{in}$), the snubber inductor 83 ($L_r$), the snubber capacitor 86 ($C_r$), and the output capacitor 87 ($C_0$), are glued or soldered on the PCB material. Capacitor 93 ($C_1$) used for filtering high frequency components of the rectified voltage is optionally connected across the rectifier array 80 output. Each terminal of these components is soldered to a corresponding copper pad on the PCB.

Of course, the above examples and description has been provided only for the purpose of illustrations, and are not intended to limit the invention in any way. As will be appreciated by the skilled person, the invention can be carried out in a great variety of ways, employing more than one technique from those described above, all without exceeding the scope of the invention.

What is claimed is:

1. An apparatus, having a modular structure, for regulating the harmonics of current drawn from power lines by an electric load, comprising:

an output capacitor connected in parallel with said load for filtering the output voltage ripple at said load;

a first rectifier circuit module consisting of an array of rectifying diodes, the inlet of which is connected to the power lines;

a second Switch and Controller Assembly (SCA) module for controlling said current to follow the voltage across said power lines by only sampling the current drawn from said power lines and the output voltage of said second SCA, said second SCA module consisting of a power switch and controller and their interconnections, the inlet of which is connected to the outlet of said first rectifier circuit module through at least one serially connected input inductor, for filtering the current drawn from the rectifier module and the output of which is connected to said output capacitor.

2. Apparatus according to claim 1, wherein the SCA comprises:

a switching transistor connected in parallel with the SCA inlet;

a high frequency rectifier diode connected in series with the SCA outlet;

an input current sampling resistor connected in series with the SCA inlet; and a control circuit for controlling the switching transistor, one inlet of said control circuit being connected to said current sampling resistor, and the other inlet being connected to the SCA outlet.

3. Apparatus according to claim 1, wherein a non-dissipative turn-on snubber for soft switching is connected to the switching and control circuit assembly, the inlet and outlet of said snubber being connected to the input and output of the SCA, respectively.

4. Apparatus according to claim 3, wherein the snubber comprises:

a) two rectifier diodes connected between a tap of the input inductor and the output;

b) an inductor connected in series with the SCA inlet; and c) a capacitor connected between the SCA inlet and the common terminal between the two rectifier diodes.

5. Apparatus according to claim 3, wherein the two rectifier diodes of the snubber are integrated into the SCA module.

6. Apparatus according to claim 1, wherein the control circuit comprises:

a reference voltage source;

a pulse width modulator fed by a multiplier, said pulse width modulator being connected to the gate of the switching transistor controlling the switching duty cycle according to the multiplier output;

a multiplier being fed by the error voltage and the voltage across the input current sampling resistor; and an amplifier being connected to the output voltage and the, reference voltage, said amplifier feeding the multiplier with an error voltage proportional to the difference between the output voltage and the reference voltage.

7. Apparatus according to claim 2, wherein the SCA contains an internal power supply circuit for the control circuit.

8. Apparatus according to claim 2, wherein an external power supply for the control circuit is connected to the SCA, via an inlet thereto.

9. Apparatus according to claim 1, wherein the switching and control assembly module is implemented as a three terminal unit, comprising one input, one output and one common terminal.

10. Apparatus according to claim 1, wherein the switching and control assembly module is implemented as a four terminal two port unit, comprising one input port and one output port.

11. Apparatus according to claim 6, wherein only semi-conductor components are contained within the switching and control assembly module, said module being fabricated as a monolithic integrated circuit.

12. Apparatus according to claim 6, wherein switching and control assembly module is fabricated as a multi-chip hybrid circuit, thereby increasing the power handling capability.

13. Apparatus according to claim 6, wherein the switching and control assembly is a monolithic integrated circuit.

14. Apparatus according to claim 13, wherein the package is a metallic or a ceramic heat dissipating package.

15. Apparatus according to claim 1, wherein the two modules are mounted separately, thereby enabling increased heat dissipation and increasing the regulated power handling of the apparatus.

16. Apparatus according to claim 12, wherein the high frequency rectifying diode is excluded from the third module, mounted separately on a heat-sink, thereby enabling increased heat dissipation and further increasing the regulated power handling of the apparatus.

17. Apparatus according to claim 7, wherein the power supply is fed from the output voltage, comprises:

a current source, connected to the output voltage terminal;

a zener diode, fed by the current source; and a smoothing capacitor, connected in parallel with the zener diode.

18. Apparatus according to claim 1, wherein a capacitor for filtering high frequency components is optionally connected across the outlet of the rectifier circuit module outlet.

19. Apparatus according to claim 1, wherein any required electrical connection between terminals of modules and terminals of structural components or of other modules are connected using wires and/or printed circuit boards.

* * * * *

UNITED STATES PATENT AND TRADEMARK OFFICE
CERTIFICATE OF CORRECTION

PATENT NO.    : 6,445,600 B2
DATED         : September 3, 2002
INVENTOR(S)   : Ben-Yaakov It is certified that error appears in the above-identified patent and that said Letters Patent is hereby corrected as shown below:

<u>Title page,</u>
Item [73], should read:
-- [73] Assignee: Green Power Technologies, Ltd.
                  Rehovot, Israel --

Signed and Sealed this

Twenty-eighth Day of January, 2003

JAMES E. ROGAN
*Director of the United States Patent and Trademark Office*